US012641453B2

(12) United States Patent
Lee et al.

(10) Patent No.: US 12,641,453 B2
(45) Date of Patent: May 26, 2026

(54) NON-STANDALONE COVERAGE STATUS DETERMINATION

(71) Applicant: QUALCOMM Incorporated, San Diego, CA (US)

(72) Inventors: Kuo-Chun Lee, San Diego, CA (US); Arvind Vardarajan Santhanam, San Diego, CA (US); Brian Clarke Banister, San Diego, CA (US); Bhupesh Manoharlal Umatt, Poway, CA (US); Xuepan Guan, San Diego, CA (US); Jyotica Yadav, San Diego, CA (US); Ehren J D Van Melle, Longmont, CO (US); Gautham Jayaram, San Diego, CA (US); Sumit Kumar Singh, San Marcos, CA (US); Touseef Khan, San Diego, CA (US); Arjun Suri, San Diego, CA (US); Sushant Vikram, San Diego, CA (US); Longjun Chen, San Diego, CA (US); Sasikanth Reddy Adapala, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 626 days.

(21) Appl. No.: 17/658,188

(22) Filed: Apr. 6, 2022

(65) Prior Publication Data

US 2023/0328556 A1 Oct. 12, 2023

(51) Int. Cl.
| | |
|---|---|
| *H04W 24/08* | (2009.01) |
| *H04W 16/18* | (2009.01) |
| *H04W 48/08* | (2009.01) |

(52) U.S. Cl.
CPC ........... *H04W 24/08* (2013.01); *H04W 16/18* (2013.01); *H04W 48/08* (2013.01)

(58) Field of Classification Search
CPC ..... H04W 24/08; H04W 16/18; H04W 48/08; H04W 48/12; H04W 48/16
See application file for complete search history.

(56) References Cited

U.S. PATENT DOCUMENTS

| | | | |
|---|---|---|---|
| 11,234,154 B2 * | 1/2022 | Yang ..................... | H04W 24/10 |
| 11,582,668 B1 * | 2/2023 | Thantharate .......... | H04W 48/18 |

(Continued)

FOREIGN PATENT DOCUMENTS

| | | |
|---|---|---|
| CN | 111479302 A | 7/2020 |
| WO | WO-2021016787 A1 | 2/2021 |
| WO | WO-2021051326 A1 | 3/2021 |

OTHER PUBLICATIONS

Partial International Search Report—PCT/US2023/062732—ISA/EPO—May 25, 2023.

*Primary Examiner* — Sharmin Chowdhury
(74) *Attorney, Agent, or Firm* — Harrity & Harrity, LLP \ Qualcomm

(57) ABSTRACT

This disclosure provides systems, methods and apparatuses for measurement of cells and determination of a non-standalone (NSA) coverage status using an NSA coverage database. The NSA coverage database may indicate candidate frequencies of New Radio (NR) cells that provide NSA coverage corresponding to a given Long Term Evolution (LTE) serving cell. The NSA coverage database may also indicate whether a system information block 1 (SIB1) has been previously received on a candidate frequency. The user equipment (UE) may perform measurement of candidate frequencies using the NSA coverage database, and may identify cases where a cell not providing NSA coverage has a same candidate frequency as a cell providing NSA coverage using the indication of whether SIB1 has been previously received on a candidate frequency.

38 Claims, 8 Drawing Sheets

(56)                    References Cited

U.S. PATENT DOCUMENTS

| | | | |
|---|---|---|---|
| 2019/0069205 A1* | 2/2019 | Lee | H04W 48/20 |
| 2021/0044993 A1* | 2/2021 | Jha | H04W 36/008355 |
| 2021/0153083 A1* | 5/2021 | Moosavi | H04W 36/0061 |
| 2021/0243624 A1* | 8/2021 | Moosavi | H04W 24/10 |
| 2021/0282077 A1* | 9/2021 | Wei | H04W 48/18 |
| 2021/0368568 A1* | 11/2021 | Jangid | H04W 72/0453 |
| 2022/0167225 A1* | 5/2022 | Kwak | H04W 36/0088 |
| 2022/0312285 A1* | 9/2022 | Xu | H04W 48/16 |
| 2023/0097617 A1* | 3/2023 | Pradhan | H04W 36/008355 |
| | | | 370/329 |
| 2023/0224809 A1* | 7/2023 | Prabhakar | H04W 48/16 |
| | | | 370/328 |
| 2024/0073719 A1* | 2/2024 | Ghosh | H04W 76/19 |
| 2024/0171298 A1* | 5/2024 | Breuer | H04K 3/226 |
| 2024/0323768 A1* | 9/2024 | Li | H04W 36/0058 |

* cited by examiner

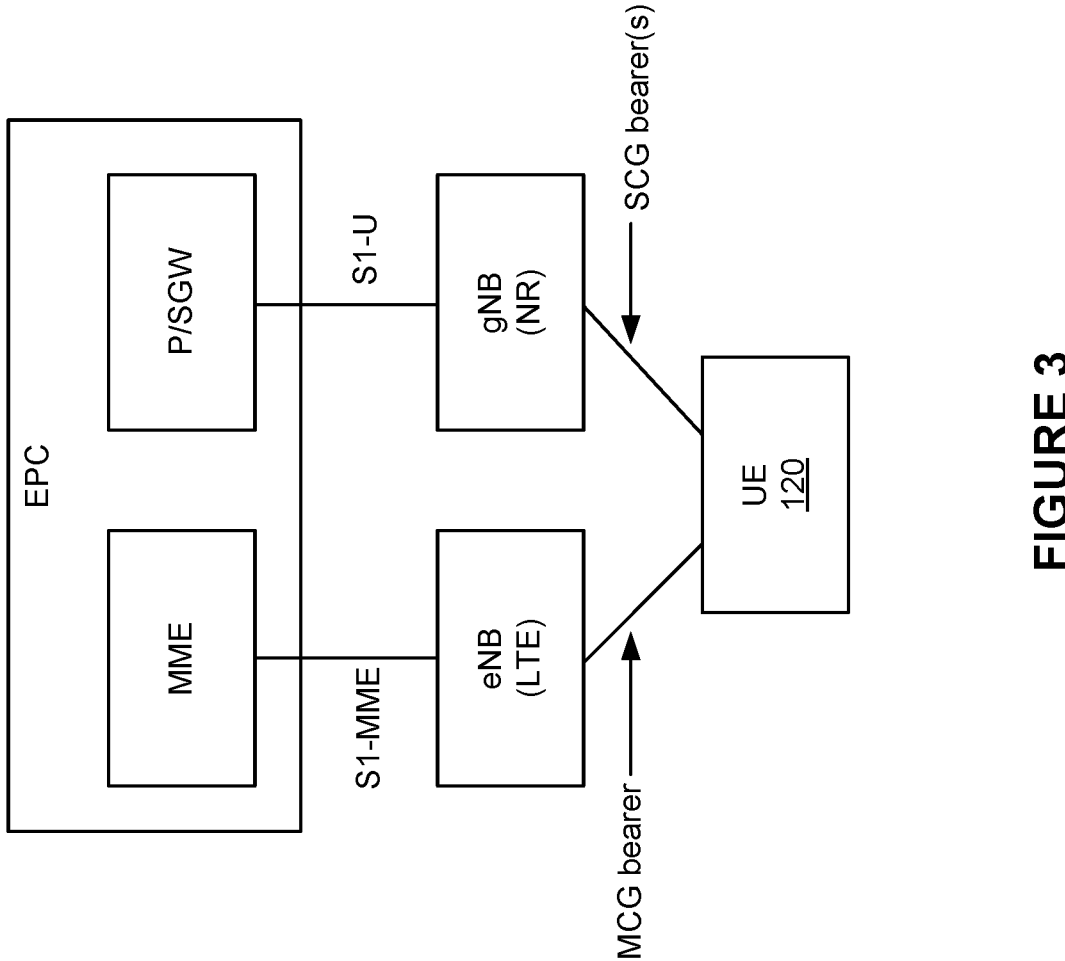
FIGURE 3

| LTE CGI | NSA freq (PSCell) | NR band | DL channel BW (MHz) | SIB1 transmitted | Timestamp |
|---|---|---|---|---|---|
| PLMN Id = x1 Cell ID = y1 | arfcn_1 | n41 | 40 | No | 303 |
| | arfcn_2 | n77 | 60 | Yes | 6356 |
| PLMN Id = x1 Cell ID = y2 | arfcn_3 | n257 | 100 | No | 2098 |
| | arfcn_4 | n260 | 200 | No | 6554 |
| PLMN Id = x2 Cell ID = y3 | arfcn_5 | n77 | 50 | No | 1088 |
| | arfcn_6 | n71 | 20 | No | 4523 |

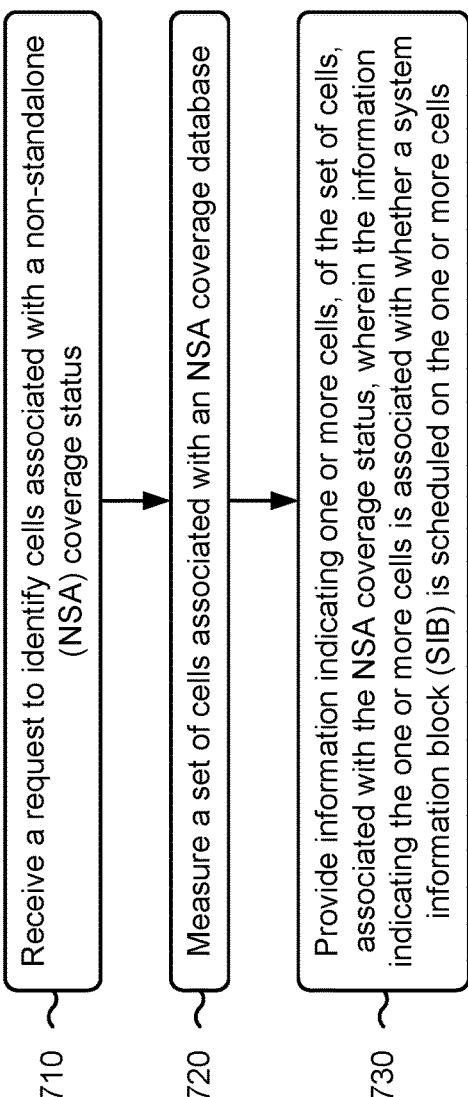

710 Receive a request to identify cells associated with a non-standalone (NSA) coverage status 720 Measure a set of cells associated with an NSA coverage database 730 Provide information indicating one or more cells, of the set of cells, associated with the NSA coverage status, wherein the information indicating the one or more cells is associated with whether a system information block (SIB) is scheduled on the one or more cells

NON-STANDALONE COVERAGE STATUS DETERMINATION

TECHNICAL FIELD

Aspects of the present disclosure relate generally to wireless communication and to techniques for non-standalone coverage status determination.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by an apparatus of a user equipment (UE). The method may include receiving a request to identify cells associated with a non-standalone (NSA) coverage status. The method may include measuring a set of cells associated with an NSA coverage database. The method may include providing information indicating one or more cells, of the set of cells, associated with the NSA coverage status, where the information indicating the one or more cells is associated with whether a system information block (SIB) is scheduled on the one or more cells In some implementations, the information indicating the one or more cells indicates that a cell, of the one or more cells, is associated with the NSA coverage status if a synchronization signal block of the cell indicates that SIB1 transmission is scheduled for the cell and the NSA coverage database indicates that a SIB1 has been received for the cell.

In some implementations, the method may include identifying a cell, of the set of cells, that is not associated with the NSA coverage status when a synchronization signal block of the cell indicates that SIB1 transmission is scheduled for the cell and the NSA coverage database indicates that a SIB1 has not been received for the cell.

Another innovative aspect of the subject matter described in this disclosure can be implemented in an apparatus of a UE for wireless communication. The apparatus may include an interface configured to obtain a request to identify cells associated with a non-standalone (NSA) coverage status. The apparatus may include a processing system configured to measure a set of cells associated with an NSA coverage database. The interface may be configured to output information indicating one or more cells, of the set of cells, associated with the NSA coverage status, where the information indicating the one or more cells is associated with whether a system information block (SIB) is scheduled on the one or more cells.

In some implementations, the information indicating the one or more cells indicates that a cell, of the one or more cells, is associated with the NSA coverage status if a synchronization signal block of the cell indicates that SIB1 transmission is scheduled for the cell and the NSA coverage database indicates that a SIB1 has been received for the cell.

In some implementations, the processing system may be configured to identify a cell, of the set of cells, that is not associated with the NSA coverage status when a synchronization signal block of the cell indicates that SIB1 transmission is scheduled for the cell and the NSA coverage database indicates that a SIB1 has not been received for the cell.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to receive a request to identify cells associated with a non-standalone (NSA) coverage status. The one or more instructions, when executed by one or more processors of a UE, may cause the one or more processors to measure a set of cells associated with an NSA coverage database. The one or more instructions, when executed by one or more processors of a UE, may cause the one or more processors to provide information indicating one or more cells, of the set of cells, associated with the NSA coverage status, wherein the information indicating the one or more cells is associated with whether a system information block (SIB) is scheduled on the one or more cells.

In some implementations, the information indicating the one or more cells indicates that a cell, of the one or more cells, is associated with the NSA coverage status if a synchronization signal block of the cell indicates that SIB1 transmission is scheduled for the cell and the NSA coverage database indicates that a SIB1 has been received for the cell.

In some implementations, one or more instructions, when executed by one or more processors of a UE, may cause the one or more processors to identify a cell, of the set of cells, that is not associated with the NSA coverage status when a synchronization signal block of the cell indicates that SIB1 transmission is scheduled for the cell and the NSA coverage database indicates that a SIB1 has not been received for the cell.

Another innovative aspect of the subject matter described in this disclosure can be implemented in an apparatus for wireless communication. The apparatus may include means for means for receiving a request to identify cells associated with a non-standalone (NSA) coverage status. The apparatus may include means for measuring a set of cells associated with an NSA coverage database. The apparatus may include means for providing information indicating one or more cells, of the set of cells, associated with the NSA coverage status, where the information indicating the one or more cells is associated with whether a system information block (SIB) is scheduled on the one or more cells.

In some implementations, the information indicating the one or more cells indicates that a cell, of the one or more cells, is associated with the NSA coverage status if a synchronization signal block of the cell indicates that SIB1 transmission is scheduled for the cell and the NSA coverage database indicates that a SIB1 has been received for the cell.

In some implementations, the apparatus further comprises means for identifying a cell, of the set of cells, that is not associated with the NSA coverage status when a synchronization signal block of the cell indicates that SIB1 transmission is scheduled for the cell and the NSA coverage database indicates that a SIB1 has not been received for the cell.

Aspects generally include a method, apparatus, system, computer program product, non-transitory computer-readable medium, user equipment, base station, wireless communication device, or processing system as substantially described herein with reference to and as illustrated by the accompanying drawings.

Details of one or more implementations of the subject matter described in this disclosure are set forth in the accompanying drawings and the description. Other features, aspects, and advantages will become apparent from the description, the drawings and the claims. Note that the relative dimensions of the following figures may not be drawn to scale.

BRIEF DESCRIPTION OF THE DRAWINGS

FIG. 3 is a diagram illustrating an example of dual connectivity, in accordance with the present disclosure.

FIG. 5 is a diagram illustrating an example of an NSA coverage database.

FIG. 7 is a diagram illustrating an example process performed, for example, by a UE.

Like reference numbers and designations in the various drawings indicate like elements.

DETAILED DESCRIPTION

Figure 1:
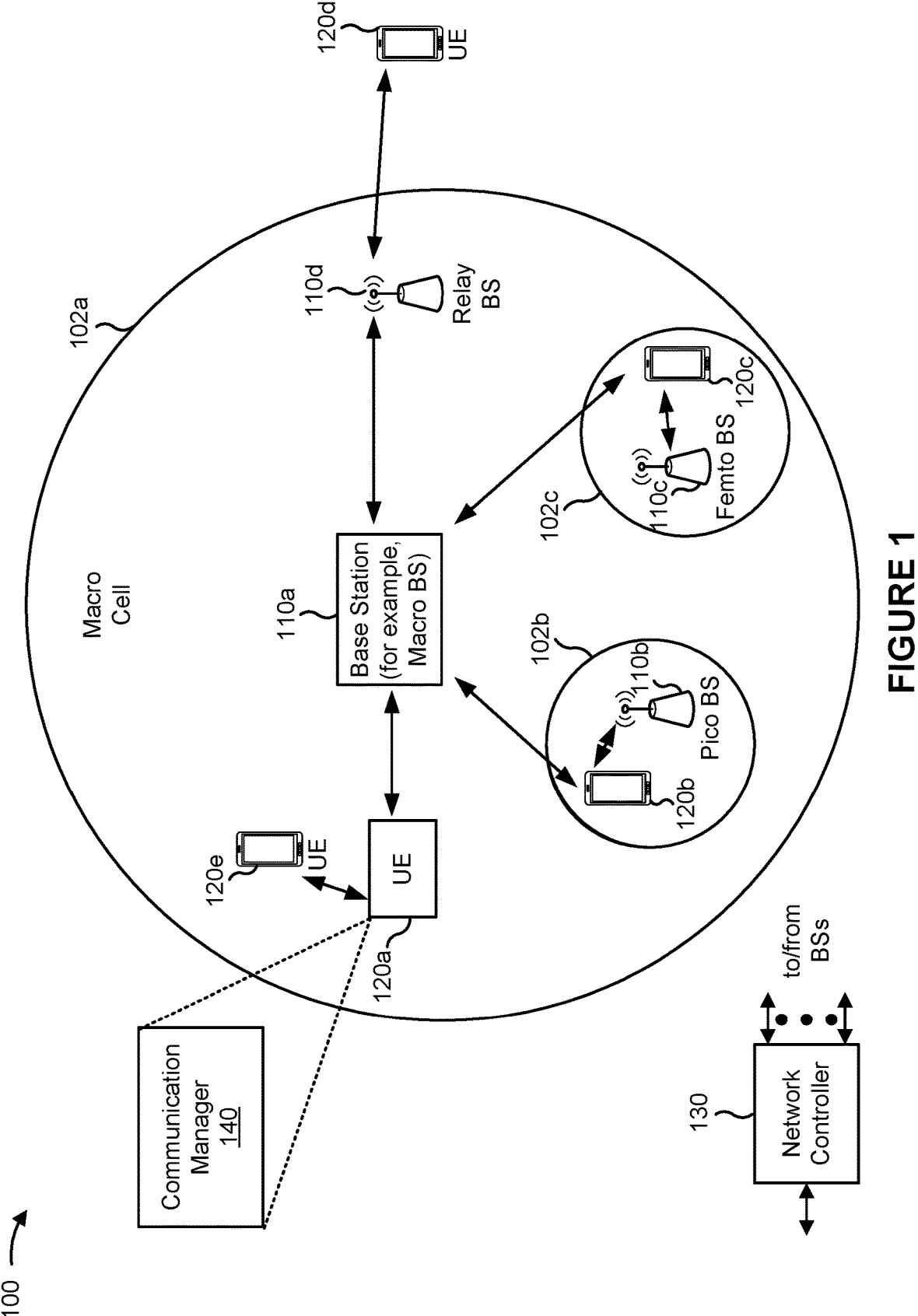
FIG. 1 is a diagram illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G technology, 4G technology, 5G technology, or further implementations thereof.

A user equipment (UE) may access a network associated with a particular radio access technology (RAT), such as LTE, New Radio (NR), or the like. As networks utilizing a particular RAT are deployed, coverage of the particular RAT may not be sufficient to provide reliable communication using the particular RAT alone. Dual connectivity (DC) allows a UE to configure a first connection associated with a first RAT and a second connection associated with a second RAT. For example, the UE may configure a first connection associated with an LTE RAT and a second connection associated with an NR RAT. The first connection may provide reliable service for the UE considering the widespread availability of LTE networks, and the second connection may allow the UE to use fifth generation (5G) services. A DC configuration with a connection on an LTE RAT and a connection on an NR RAT may be referred to as Evolved Universal Mobile Telecommunications System Terrestrial Radio Access (E-UTRA)-NR dual connectivity (EN-DC) mode. When the UE uses an EN-DC for communication via an LTE RAT and an NR RAT, the UE may be said to be in a non-standalone (NSA) mode.

As mentioned above, the usage of NSA mode may provide a path to implementation of NR networks while NR coverage is inconsistent. Thus, the UE may not always be in coverage of a network node (or group of network nodes) that can support EN-DC communication. When the UE is in radio resource control (RRC) idle mode with regard to an LTE network, it may be beneficial for an application of the UE to determine whether the UE has EN-DC coverage, such as to facilitate access to a 5G service by the application. A system information block (SIB) referred to as SIB2 may provide an information element (IE) that indicates whether a network supports EN-DC. For example, an LTE network node may transmit a SIB2 including the IE, and the IE may indicate whether the LTE network node is co-located with an NR network node that can facilitate EN-DC communication. In some examples, the IE may include an UpperLayerIndication IE. However, in some cases, the IE may be out of date. For example, NR coverage of the UE may change on a shorter time scale than a time scale at which the SIB2 is received. Thus, it may be beneficial to determine, in real time (e.g., based on a request from an application of the UE), whether the UE is associated with EN-DC coverage, such as by measuring to determine whether the UE is associated with EN-DC coverage. However, the process of measuring for EN-DC coverage (such as NR frequencies that support EN-DC communication) may be time consuming and may consume significant battery power if performed indiscriminately, such as across all possible NR frequencies and bands.

Techniques described herein provide measurement of cells and determination of an NSA coverage status using an NSA coverage database. The NSA coverage database may indicate candidate frequencies of NR cells that provide NSA coverage corresponding to a given LTE serving cell. The NSA coverage database may also indicate whether a system information block 1 (SIB1) has been previously received on a candidate frequency. The UE may perform measurement of candidate frequencies using the NSA coverage database, and may identify cases where a cell not providing NSA coverage has a same candidate frequency as a cell providing NSA coverage using the indication of whether SIB1 has been previously received on a candidate frequency.

Particular implementations of the subject matter described in this disclosure can be implemented to realize one or more of the following potential advantages. The usage of the NSA coverage database expedites the UE's measurement of candidate frequencies, which reduces power consumption and latency associated with determination of NSA coverage status. The indication of whether a SIB1 has previously been received on a candidate frequency reduces the likelihood of erroneously detecting a standalone (SA) mode cell on the same frequency as a previously detected NSA cell, which reduces delay associated with configuration of an NSA mode.

FIG. 1 is a diagram illustrating an example of a wireless network 100. The wireless network 100 may be or may include elements of a 5G (for example, NR) network or a 4G (for example, LTE) network, among other examples. The wireless network 100 may include one or more network entities, such as one or more base stations 110 (shown as a BS 110a, a BS 110b, a BS 110c, and a BS 110d), a UE 120 or multiple UEs 120 (shown as a UE 120a, a UE 120b, a UE 120c, a UE 120d, and a UE 120e), or other network entities. A base station 110 is an example of a network entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells.

In some examples, a cell may not necessarily be stationary, and the geographic area of the cell may move according to the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station) may communicate with the BS 110a (for example, a macro base station) and the UE 120d in order to facilitate communication between the B S 110a and the UE 120d. A base station 110 that relays communications may be referred to as a relay station, a relay base station, or a relay.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-todevice (D2D) communications, a vehicle-to-everything (V2X) protocol (for example, which may include a vehicleto-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive a request to identify cells associated with an NSA coverage status; measure a set of cells associated with an NSA coverage database; and provide information indicating one or more cells, of the set of cells, associated with the NSA coverage status, wherein the information indicating the one or more cells is associated with whether a SIB is scheduled on the one or more cells. Additionally, or alternatively, the communication manager 140 may perform one or more other operations described herein.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), TRP, or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more central units (CUs), one or more distributed units (DUs), one or more radio units (RUs), or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

Figure 2:
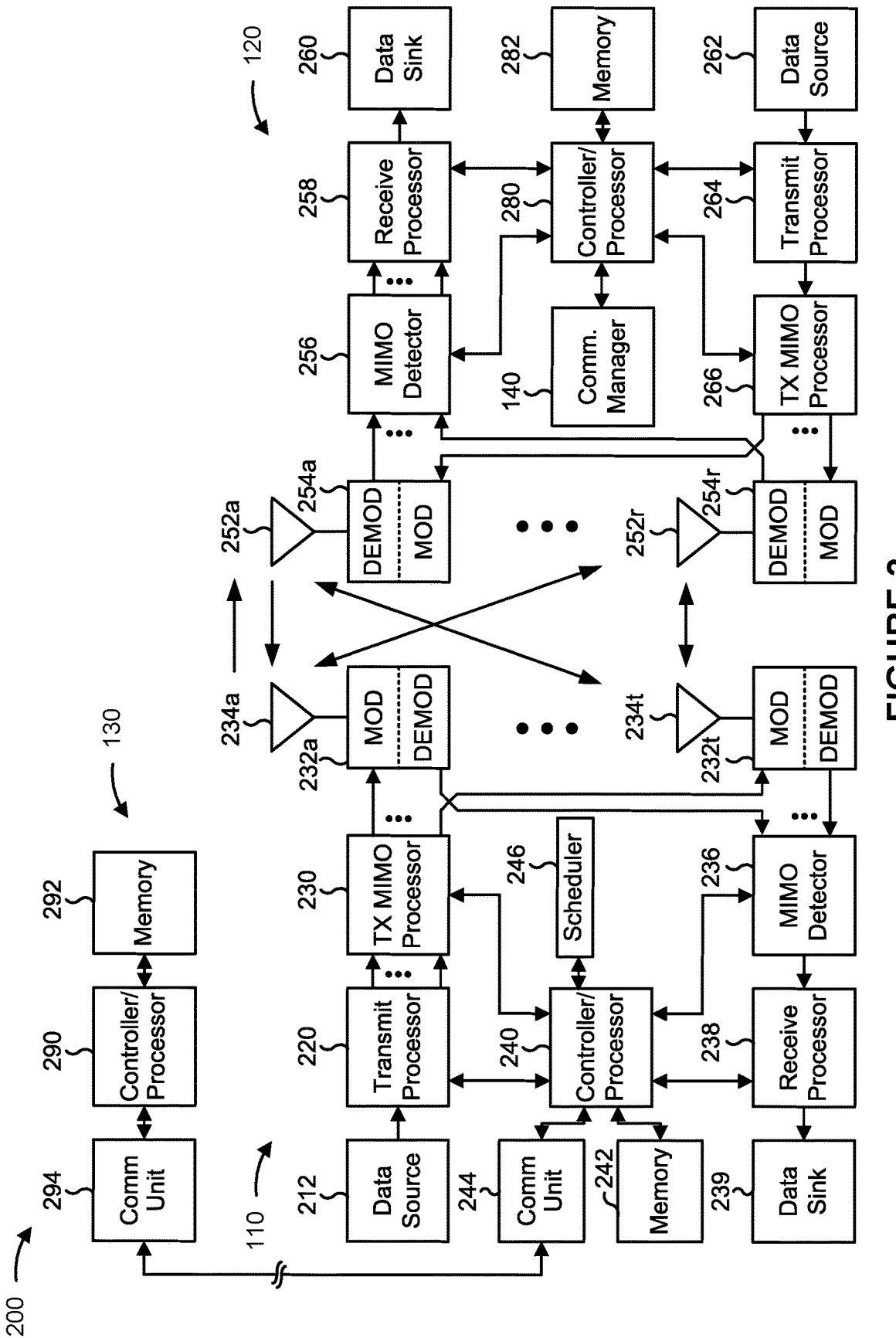
FIG. 2 is a diagram illustrating an example of a base station in communication with a user equipment (UE) in a wireless network.

FIG. 2 is a diagram illustrating an example 200 of a base station 110 in communication with a UE 120 in a wireless network 100. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The base station 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232.

Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein.

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

The controller/processor 240 of the base station 110, the controller/processor 280 of the UE 120, or any other component(s) of FIG. 2 may perform one or more techniques associated with NSA coverage status determination, as described in more detail elsewhere herein. For example, the controller/processor 240 of the base station 110, the controller/processor 280 of the UE 120, or any other component(s) (or combinations of components) of FIG. 2 may perform or direct operations of, for example, process 700 of FIG. 7, or other processes as described herein. The memory 242 and the memory 282 may store data and program codes for the base station 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 700 of FIG. 7, or other processes as described herein. In some examples, executing instructions may include running the instructions, converting the instructions, compiling the instructions, or interpreting the instructions.

In some aspects, a UE (e.g., UE 120) includes means for receiving a request to identify cells associated with an NSA coverage status; means for measuring a set of cells associated with an NSA coverage database; and/or means for providing information indicating one or more cells, of the set of cells, associated with the NSA coverage status, wherein the information indicating the one or more cells is associated with whether a SIB is scheduled on the one or more cells. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described with respect to the blocks may be implemented in a single hardware, software, or combination component or in various combinations of components. For example, the functions described with respect to the transmit processor 264, the receive processor 258, the TX MIMO processor 266, or another processor may be performed by or under the control of the controller/processor 280.

FIG. 3 is a diagram illustrating an example 300 of dual connectivity, in accordance with the present disclosure. The example shown in FIG. 3 is for an EN-DC mode. In the EN-DC mode, a UE 120 communicates using an LTE RAT on a master cell group (MCG), and the UE 120 communicates using an NR RAT on a secondary cell group (SCG). The EN-DC mode is sometimes referred to as an NR or 5G NSA mode. Thus, as used herein, "dual connectivity mode" may refer to an EN-DC mode and/or another type of dual connectivity mode.

As shown in FIG. 3, a UE 120 may communicate with both an eNB (e.g., a 4G base station 110 or network node) and a gNB (e.g., a 5G base station 110 or network node), and the eNB and the gNB may communicate (e.g., directly or indirectly) with a 4G/LTE core network, shown as an evolved packet core (EPC) that includes a mobility management entity (MME), a packet data network gateway (PGW), a serving gateway (SGW), and/or other devices. In FIG. 3, the PGW and the SGW are shown collectively as P/SGW. In some aspects, the eNB and the gNB may be co-located at the same base station 110. In some aspects, the eNB and the gNB may be included in different base stations 110 (e.g., may not be co-located). Additionally, or alternatively, the eNB and the gNB may be implemented in a distributed fashion.

As further shown in FIG. 3, in some aspects, a wireless network that permits operation in a 5G NSA mode may permit such operations using an MCG for a first RAT (e.g., an LTE RAT or a 4G RAT) and an SCG for a second RAT (e.g., an NR RAT or a 5G RAT). In this case, the UE 120 may communicate with the eNB via the MCG and may communicate with the gNB via the SCG. In some aspects, the MCG may anchor a network connection between the UE 120 and the 4G/LTE core network (e.g., for mobility, coverage, and/or control plane information), and the SCG may be added as additional carriers to increase throughput (e.g., for data traffic and/or user plane information). In some aspects, the gNB and the eNB may not transfer user plane information between one another. In some aspects, a UE 120 operating in a dual connectivity mode may be concurrently connected with an LTE base station 110 (e.g., an eNB) and an NR base station 110 (e.g., a gNB) (e.g., in the case of EN-DC C), or the UE 120 may be concurrently connected with one or more base stations 110 that use the same RAT. In some aspects, the MCG may be associated with a first frequency band (e.g., a sub-6 GHz band and/or an FR1 band), and the SCG may be associated with a second frequency band (e.g., a millimeter wave band and/or an FR2 band).

The UE 120 may communicate via the MCG and the SCG using one or more radio bearers (e.g., data radio bearers (DRBs) and/or signaling radio bearers (SRBs)). For example, the UE 120 may transmit or receive data via the MCG and/or the SCG using one or more DRBs. Similarly, the UE 120 may transmit or receive control information (e.g., RRC information and/or measurement reports) using one or more SRBs. In some aspects, a radio bearer may be dedicated to a specific cell group (e.g., a radio bearer may be an MCG bearer or an SCG bearer). In some aspects, a radio bearer may be a split radio bearer. A split radio bearer may be split in the uplink and/or in the downlink. For example, a DRB may be split on the downlink (e.g., the UE 120 may receive downlink information for the MCG or the SCG in the DRB) but not on the uplink (e.g., the uplink may be non-split with a primary path to the MCG or the SCG, such that the UE 120 transmits in the uplink only on the primary path). In some aspects, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB.

As indicated above, FIG. 3 is provided as an example. Other examples may differ from what is described with respect to FIG. 3.

Figure 4:
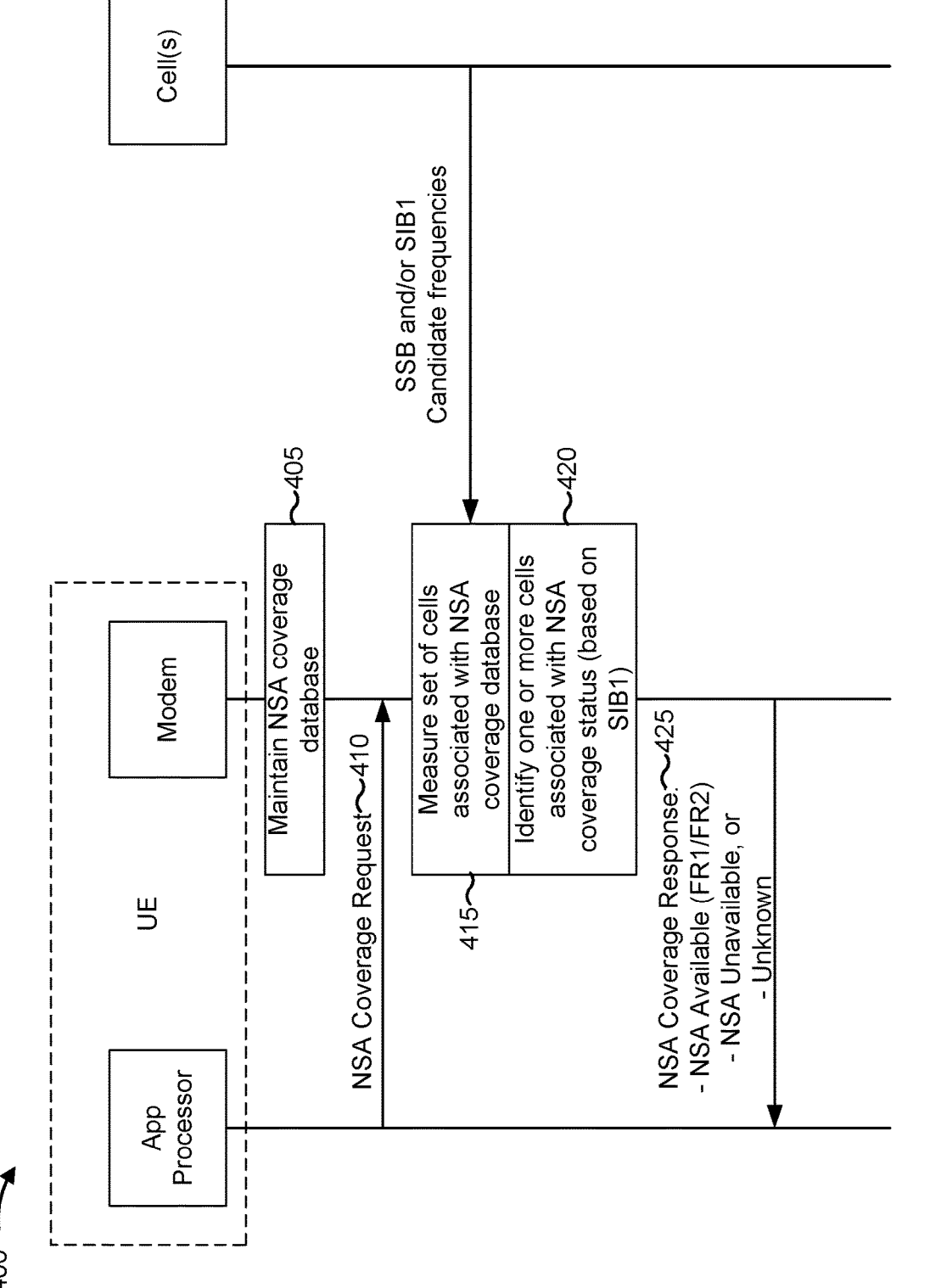
FIG. 4 is a diagram illustrating an example of non-standalone (NSA) coverage determination using an NSA coverage database, in accordance with the present disclosure.

FIG. 4 is a diagram illustrating an example 400 of NSA coverage determination using an NSA coverage database, in accordance with the present disclosure. Example 400 includes a UE (e.g., UE 120) and a network node (e.g., base station 110, the eNB and/or gNB of FIG. 3).

As shown, the UE may include a modem (e.g., modem 254, one or more processors of FIG. 2) and an application processor (e.g., one or more processors of FIG. 2 or another processor of the UE). The application processor may instantiate, for example, one or more applications. The one or more applications can include any application operable on a UE. An application may consume and/or generate data packets that are communicated between the UE and the network node. The modem and the application processor may communicate via an interface, such as an application programming interface or a modem control interface.

As shown by reference number 405, the UE (such as the modem of the UE) may maintain an NSA coverage database. An NSA coverage database is a data structure. An NSA coverage database may include information indicating one or more NR frequencies associated with an LTE serving cell. For example, the NSA coverage database may indicate, for a given LTE serving cell, each NR frequency that has been detected as providing NSA coverage. Thus, when the UE is camped on an LTE serving cell identified by the NSA coverage database, the UE can identify NR frequencies that have been observed as providing NSA coverage while camped on the LTE serving cell.

FIG. 5 is a diagram illustrating an example of an NSA coverage database. As shown, the NSA coverage database may indicate a cell global identity (CGI) of an LTE cell, a set of candidate frequencies associated with the CGI, an NR band associated with each candidate frequency, a downlink channel bandwidth (e.g., a configured channel bandwidth) associated with each candidate frequency, whether or not a SIB1 is transmitted at the candidate frequency, and a time stamp. A candidate frequency may be identified by an NR absolute radio-frequency channel number (ARFCN) in some aspects. For example, the NR ARFCN may indicate a frequency at which a synchronization signal block (SSB) of an NR cell (such as a primary secondary cell (PSCell) of an EN-DC configuration) associated with the candidate frequency can be detected. A time stamp associated with a candidate frequency may indicate a time at which a PSCell was established on the candidate frequency (e.g., in terms of seconds, from a start of the PSCell).

SIB1 is a SIB with a fixed schedule and periodicity (with repetition within the periodicity). SIB1 carries serving cell information (e.g., information relevant when evaluating if a UE is allowed to access a cell, and information that defines the scheduling of other system information). SIB1 also provides radio resource configuration information that is common for all UEs, and barring information associated with unified access control. In some aspects, SIB1 is referred to as "remaining minimum system information." When operating in NSA mode or EN-DC, transmission of SIB1 is not required. The NSA coverage database may indicate whether a SIB1 was transmitted by a cell associated with a given frequency entry when the given frequency entry was added to the NSA coverage database.

In some aspects, the NSA coverage database (which may be referred to as a fingerprint database) may be retained across power cycles of the UE. In some aspects, the NSA coverage database may include a limited number of entries. If the limited number of entries is reached or exceeded, then the UE may remove an entry with an oldest time stamp before adding a new entry.

As an example, the UE may be camped on an LTE serving cell with a CGI of [x1, y1]. The entries of the NSA coverage database corresponding to this LTE serving cell are shown by reference number 510. As shown, the NSA coverage database may include two entries associated with this LTE serving cell: a first entry with a candidate frequency at arfcn_1, in NR band n41, a channel bandwidth of 40 MHz, and no transmitted SIB1; and a second entry with a candidate frequency at arfcn_2, in NR band n77, a channel bandwidth of 60 MHz, and a SIB1 transmitted. Thus, if the UE receives a request to identify cells with an NSA coverage status while camped on the LTE serving cell with the CGI of [x1, y1], the UE may measure the candidate frequencies at arfcn_1 and arfcn_2 to identify an NR cell that can provide NSA coverage (e.g., as a PSCell).

The UE may be camped on an LTE serving cell when the UE is in an RRC idle mode and monitoring system information of the LTE serving cell. For example, the UE may perform a tracking area update regarding the LTE serving cell to camp on the LTE serving cell.

Returning to FIG. 4, as shown by reference number 410, the UE (e.g., the application processor of the UE) may provide a request to identify cells associated with an NSA coverage status. For example, the modem of the UE may receive the request (illustrated as an NSA coverage request) from the application processor of the UE. An NSA coverage status may indicate whether or not a cell (such as an NR cell) can provide NSA coverage for the UE. For example, a cell associated with an NSA coverage status may include an NR cell that can facilitate an NR connection of an EN-DC configuration of the UE.

As shown by reference number 415, the UE (e.g., the modem of the UE) may measure a set of cells (e.g., candidate frequencies identified as associated with the set of cells) associated with the NSA coverage database. For example, the UE may identify an LTE serving cell of the UE. The UE may identify one or more cells with one or more corresponding candidate frequencies, associated with the LTE serving cell, by reference to the NSA coverage database. For example, the UE may identify a set of candidate frequencies that are mapped to a CGI of the LTE serving cell by the NSA coverage database. As another example, referring to reference number 510 of FIG. 5, if the UE is camped on an LTE serving cell with a public land mobile network (PLMN) identifier of x1 and a cell identifier of y1, the UE may identify candidate frequencies of arfcn_1 and arfcn_2. If the UE's current LTE serving cell's CGI is not identified by the NSA coverage database, then the UE may select a set of candidate frequencies (e.g., k frequencies, where k is an integer) that are associated with the same PLMN as the UE's current LTE serving cell and that were most recently added to the NSA coverage database (as indicated by the corresponding time stamps). For example, if the UE's current serving cell was associated with a PLMN identifier of x1 and a cell identifier of y4 (where y4 is not in the NSA coverage database), then the UE may identify a set of cells associated with candidate frequencies at arfcn_2 and arfcn_4 based at least in part on the set of cells being associated with the same PLMN identifier as the UE's current serving cell.

As mentioned, the UE may measure the set of cells. For example, the UE may monitor candidate frequencies associated with the set of cells (e.g., one candidate frequency per cell, as indicated by the NSA coverage database) to detect an SSB transmitted by a cell of the set of cells. In some aspects, the UE may determine a metric associated with a cell, such as an RSRP. In some aspects, the UE may measure a set of cells (such as a set of candidate frequencies) based on a band criterion or a bandwidth threshold. The band criterion or the bandwidth threshold can be indicated by the request shown by reference number 410 or can be pre-configured on the modem of the UE. The band criterion may indicate a selected band list, and the UE may measure only candidate frequencies associated with bands identified by the selected band list. The bandwidth threshold may indicate a minimum (and/or maximum) bandwidth, and the UE may measure only candidate frequencies associated with channel bandwidths that satisfy the bandwidth threshold. The UE may identify such candidate frequencies by reference to the NSA coverage database.

As shown by reference number 420, the UE may identify one or more cells associated with the NSA coverage status. The one or more cells can be in FR1, FR2, or another frequency range. A cell may or may not be associated with the NSA coverage status depending on whether an SSB of the cell indicates that SIB1 transmission is scheduled for the cell and whether the NSA coverage database indicates that the SIB1 has been received on the cell.

As indicated above, FIGS. 4 and 5 are provided as an example. Other examples may differ from what is described with respect to FIGS. 4 and 5.

Figure 6:
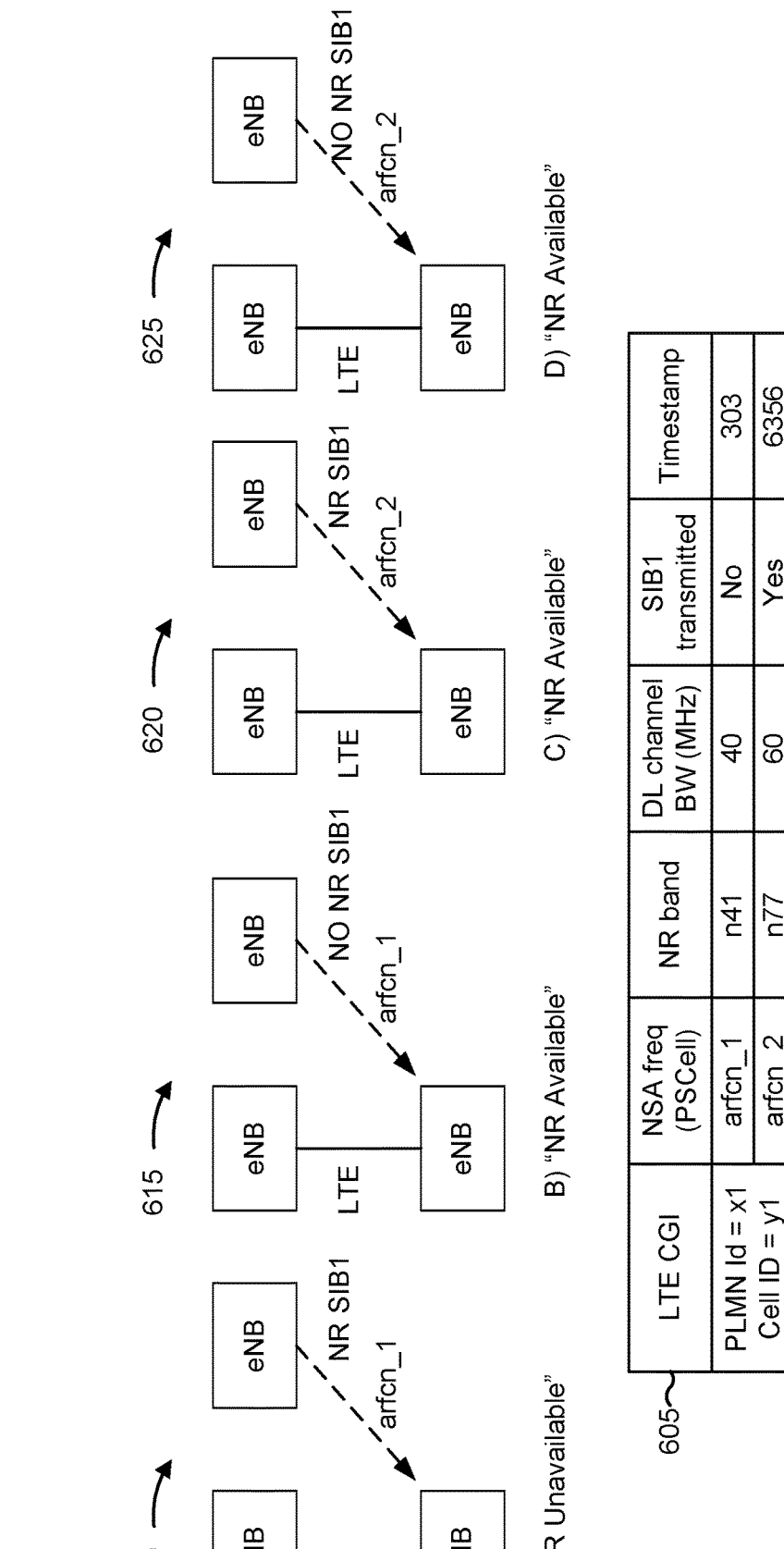
FIG. 6 is a diagram illustrating an example of determining whether a cell is associated with an NSA coverage status based on a system information block 1 (SIB1).

FIG. 6 is a diagram illustrating an example 600 of determining whether a cell is associated with an NSA coverage status based on a SIB1. Example 600 includes an NSA coverage database 605 that includes an entry for a cell associated with a candidate frequency arfcn_1 on which a SIB1 is not transmitted, and an entry for a cell associated with a candidate frequency arfcn_2 on which a SIB1 is transmitted. Examples 610 and 615 relate to the cell associated with the candidate frequency arfcn_1, and examples 620 and 625 relate to the cell associated with the candidate frequency arfcn_2. The cell associated with the candidate frequency arfcn_1 does not have a SIB1 transmitted (according to the NSA coverage database 605, such as based on a previous connection with the cell), and the cell associated with the candidate frequency arfcn_2 has a SIB1 transmitted according to the NSA coverage database 605.

The UE may determine whether a cell has SIB1 transmission scheduled. For example, the UE may refer to an SSB of the cell to determine whether the cell has SIB1 transmission scheduled. In such examples, the UE may determine whether SIB1 transmission is scheduled via a frequency offset parameter (e.g., Kssb, which corresponds to the parameter ssb-SubcarrierOffset and indicates a frequency domain offset between the SSB and the overall resource block grid in terms of subcarriers). For example, in FR1, the UE may determine that SIB1 transmission is scheduled on a cell if the frequency offset parameter indicates a value less than or equal to 23. As another example, in FR2, the UE may determine that SIB1 transmission is scheduled on a cell if the frequency offset parameter indicates a value less than or equal to 11.

In example 610, the SSB of the cell indicates that SIB1 transmission is scheduled for the cell (as indicated by "NR SIB1"), and the NSA coverage database 605 indicates that a SIB1 has not been transmitted for the cell. Therefore, in example 610, the UE determines that NSA coverage is not available on the cell, since it is likely that the cell being measured at the candidate frequency is different than the cell indicated by the NSA coverage database 605 (due to the mismatch between SIB1 being scheduled on the cell and SIB1 not being previously transmitted according to the NSA coverage database 605).

In example 615, the SSB of the cell indicates that SIB1 transmission is not scheduled for the cell (as indicated by "NO NR SIB1"), and the NSA coverage database 605 indicates that a SIB1 has not been transmitted for the cell. Therefore, in example 615, the UE determines that NSA coverage is available on the cell, since it is likely that the cell being measured at the candidate frequency is the same as the cell indicated by the NSA coverage database 605.

In example 620, the SSB of the cell indicates that SIB1 transmission is scheduled for the cell (as indicated by "NR SIB1"), and the NSA coverage database 605 indicates that a SIB1 has been transmitted for the cell. Therefore, in example 620, the UE determines that NSA coverage is available on the cell, since it is likely that the cell being measured at the candidate frequency is the same as the cell indicated by the NSA coverage database 605.

In example 625, the SSB of the cell indicates that SIB1 transmission is not scheduled for the cell (as indicated by "NO NR SIB1"), and the NSA coverage database 605 indicates that a SIB1 has been transmitted for the cell. Therefore, in example 625, the UE determines that NSA coverage is available on the cell, since an NR cell that does not transmit SIB1 is detected.

It is advantageous for the NSA coverage database 605 to indicate whether SIB1 has been transmitted for a cell since some operators may choose to broadcast SIB1 in cells associated with an NSA coverage status. Therefore, it is inconclusive to determine whether or not a cell is associated with an NSA based only on whether SIB1 is transmitted. By indicating whether SIB1 has been transmitted for a cell associated with NSA coverage status, the NSA coverage database 605 enables the UE to determine that a cell on which SIB1 is scheduled is not associated with an NSA coverage status (based on a difference between the indication of the NSA coverage database 605 and the scheduled SIB1 transmission of the cell, which indicates that the measured cell is different than a cell used to populate the NSA coverage database).

Returning to FIG. 4, as shown by reference number 425, the UE (e.g., the modem of the UE) may provide (e.g., to the application processor of the UE) information indicating the one or more cells associated with the NSA coverage status. The information indicating the one or more cells associated with the NSA coverage status may be associated with whether a SIB1 is scheduled on the one or more cells, as described in connection with FIG. 6. For example, the status of whether a SIB1 is scheduled on the one or more cells may be used to determine whether the one or more cells are associated with the NSA coverage status, such as in conjunction with the NSA coverage database.

In some aspects, the information may indicate that NSA coverage is available (e.g., that a measured cell is associated with the NSA coverage status). For example, the information may indicate that NSA coverage is available if the UE can search and measure the candidate frequencies according to the NSA coverage database, and the UE detects at least one NR cell on a corresponding candidate frequency with an RSRP metric that satisfies a configurable threshold.

In some aspects, the information may indicate that NSA coverage is unavailable (e.g., that no measured cell is associated with the NSA coverage status). For example, the UE may provide an indication that NSA coverage is unavailable based on detecting no NR cell, associated with an RSRP metric that satisfies a configurable threshold, on candidate frequencies indicated by the NSA coverage database.

In some aspects, the information may indicate that NSA coverage status is unknown. In some aspects, the information may indicate that NSA coverage status is unknown based on the UE being in connected mode when the NSA coverage request shown by reference number 410 is received. In some aspects, the in information may indicate that NSA coverage status is unknown based on the UE being associated with (e.g., camped on, covered by) a 2G or 3G network. In some aspects, the information may indicate that NSA coverage status is unknown based on the NSA coverage database including no frequency entries (e.g., no frequency entries at all, no frequency entries associated with a PLMN of an LTE serving cell of the UE).

In some aspects, the UE may perform an action based on the NSA coverage status. For example, an application may provide, for display, an indication of NSA coverage status (such as a 5G+ icon). As another example, the UE may establish an EN-DC configuration and may communicate with an LTE network and a 5G network using the EN-DC configuration.

As indicated above, FIG. 6 is provided as an example. Other examples may differ from what is described with respect to FIG. 6.

FIG. 7 is a diagram illustrating an example process 700 performed, for example, by a UE. The process 700 is an example where the UE (for example, an apparatus of UE 120, or UE 120) performs operations associated with non-standalone coverage status determination.

As shown in FIG. 7, in some aspects, the process 700 may include receiving a request to identify cells associated with an NSA coverage status (block 710). For example, the UE (such as by using communication manager 140 or interface component 808, depicted in FIG. 8) may receive a request to identify cells associated with an NSA coverage status.

As further shown in FIG. 7, in some aspects, the process 700 may include measuring a set of cells associated with an NSA coverage database (block 720). For example, the UE (such as by using communication manager 140 or measurement component 810, depicted in FIG. 8) may measure a set of cells associated with an NSA coverage database.

As further shown in FIG. 7, in some aspects, the process 700 may include providing information indicating one or more cells, of the set of cells, associated with the NSA coverage status, wherein the information indicating the one or more cells is associated with whether a SIB is scheduled on the one or more cells (block 730). For example, the UE (such as by using communication manager 140 or interface component 808, depicted in FIG. 8) may provide information indicating one or more cells, of the set of cells, associated with the NSA coverage status, wherein the information indicating the one or more cells is associated with whether a SIB is scheduled on the one or more cells.

The process 700 may include additional aspects, such as any single aspect or any combination of aspects described in connection with the process 700 or in connection with one or more other processes described elsewhere herein.

In a first additional aspect, the information indicating the one or more cells indicates that a cell, of the one or more cells, is associated with the NSA coverage status if a synchronization signal block of the cell indicates that SIB1 transmission is scheduled for the cell and the NSA coverage database indicates that a SIB1 has been received for the cell.

In a second additional aspect, alone or in combination with the first aspect, the synchronization signal block indicates that SIB1 transmission is scheduled for the cell via a frequency offset parameter of the synchronization signal block.

In a third additional aspect, alone or in combination with one or more of the first and second aspects, the process 700 includes identifying a cell, of the set of cells, that is not associated with the NSA coverage status when a synchronization signal block of the cell indicates that SIB1 transmission is scheduled for the cell and the NSA coverage database indicates that a SIB1 has not been received for the cell.

In a fourth additional aspect, alone or in combination with one or more of the first through third aspects, the information indicating the one or more cells indicates cells associated with the NSA coverage status that satisfy at least one of a band criterion, or a bandwidth threshold.

In a fifth additional aspect, alone or in combination with one or more of the first through fourth aspects, the band criterion or the bandwidth threshold is indicated by the request.

In a sixth additional aspect, alone or in combination with one or more of the first through fifth aspects, the band criterion or the bandwidth threshold is configured.

In a seventh additional aspect, alone or in combination with one or more of the first through sixth aspects, the NSA coverage database indicates NR frequencies that are identified as providing NSA coverage while the UE is camped on a given LTE cell and PLMN, and wherein the NSA coverage database indicates that the set of NR frequencies are associated with a current LTE serving cell or PLMN of the UE.

In an eighth additional aspect, alone or in combination with one or more of the first through seventh aspects, the NSA coverage database indicates NR cells that are identified as providing NSA coverage while the UE is camped on a given LTE cell PLMN, and wherein, if a current LTE serving cell of the UE is not identified by the NSA coverage database, the set of cells are a set of most recently identified cells of the NSA coverage database associated with a same PLMN as the current LTE serving cell.

In a ninth additional aspect, alone or in combination with one or more of the first through eighth aspects, the process 700 includes providing an indication that an NSA coverage status is unknown.

In a tenth additional aspect, alone or in combination with one or more of the first through ninth aspects, the NSA coverage status is unknown if the UE is in a connected mode, the UE is associated with a 2G network or a 3G network, or there are no frequency entries in the NSA coverage database.

In an eleventh additional aspect, alone or in combination with one or more of the first through tenth aspects, the NSA coverage status indicates that a cell, associated with the NSA coverage status, can provide NSA service in a dual connectivity mode.

Although FIG. 7 shows example blocks of the process 700, in some aspects, the process 700 may include additional blocks, fewer blocks, different blocks, or differently arranged blocks than those depicted in FIG. 7. Additionally, or alternatively, two or more of the blocks of the process 700 may be performed in parallel.

Figure 8:
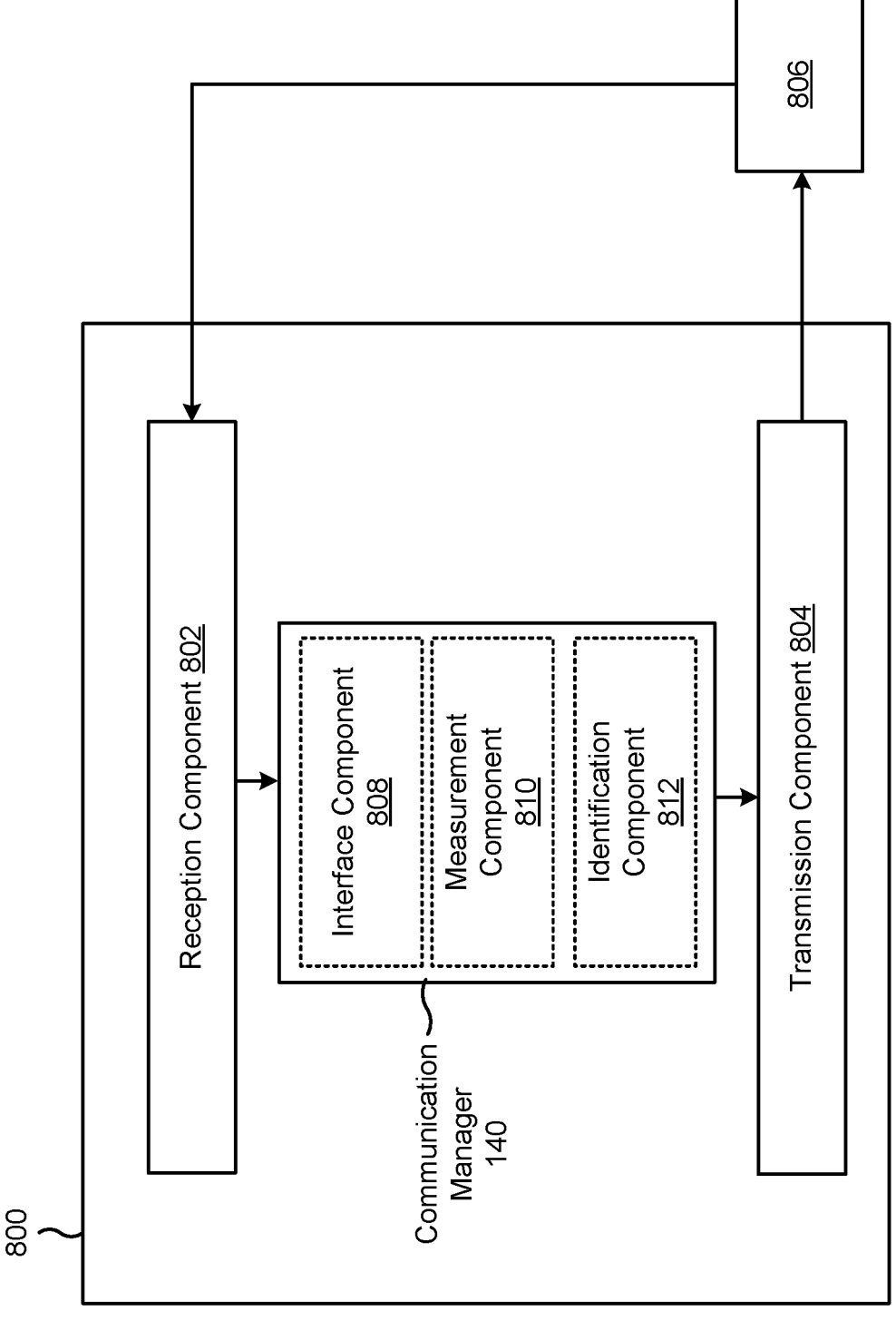
FIG. 8 is a diagram of an example apparatus for wireless communication.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a interface component 808, a measurement component 810, and/or an identification component 812, among other examples.

In some aspects, the apparatus 800 may be configured to perform one or more operations described herein in connection with FIGS. 3-6. Additionally, or alternatively, the apparatus 800 may be configured to perform one or more processes described herein, such as process 700 of FIG. 7, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may be controlled by the measurement component 810 to perform a measurement relating to an NSA coverage database. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The interface component 808 may receive a request to identify cells associated with an NSA coverage status. The measurement component 810 may measure a set of cells associated with an NSA coverage database. The interface component 808 may provide information indicating one or more cells, of the set of cells, associated with the NSA coverage status, wherein the information indicating the one or more cells is associated with whether a SIB is scheduled on the one or more cells. In some aspects, the interface component 808 may include an interface between an application processor of the apparatus and a modem of the apparatus, such as an application programming interface (API) or a modem control interface.

The identification component 812 may identify a cell, of the set of cells, that is not associated with the NSA coverage status when a synchronization signal block of the cell indicates that SIB1 transmission is scheduled for the cell and the NSA coverage database indicates that a SIB1 has not been received for the cell.

The interface component 808 may provide an indication that an NSA coverage status is unknown.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The foregoing disclosure provides illustration and description but is not intended to be exhaustive or to limit the aspects to the precise forms disclosed. Modifications and variations may be made in light of the disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by an apparatus of a user equipment (UE), comprising:
  receiving a request to identify cells associated with a non-standalone (NSA) coverage status;
  measuring a set of frequencies, associated with a Long Term Evolution (LTE) cell, referenced by an NSA coverage database,
    wherein the NSA coverage database is maintained by the UE; and
  providing information indicating one or more cells, of a set of cells associated with the set of frequencies, associated with the NSA coverage status,
    wherein the information is associated with whether a system information block (SIB) is scheduled on the one or more cells, and
    wherein the information indicates that a cell, of the one or more cells, is associated with the NSA coverage status if a synchronization signal block of the cell indicates that SIB1 transmission is scheduled for the cell and the NSA coverage database indicates that a SIB1 has been received for the cell.

2. The method of claim 1, wherein the synchronization signal block indicates that the SIB1 transmission is scheduled for the cell via a frequency offset parameter of the synchronization signal block.

3. The method of claim 1, further comprising:
  identifying another cell, of the set of cells, that is not associated with the NSA coverage status when a synchronization signal block of the other cell indicates that SIB1 transmission is scheduled for the other cell and the NSA coverage database indicates that a SIB1 has not been received for the other cell.

4. The method of claim 1, wherein the information indicates cells associated with the NSA coverage status that satisfy at least one of:
  a band criterion, or
  a bandwidth threshold.

5. The method of claim 4, wherein the band criterion or the bandwidth threshold is indicated by the request.

6. The method of claim 4, wherein the band criterion or the bandwidth threshold is configured.

7. The method of claim 1, wherein the NSA coverage database indicates New Radio (NR) frequencies that are identified as providing NSA coverage while the UE is camped on a given LTE cell and public land mobile network (PLMN), and wherein the NSA coverage database indicates that the NR frequencies are associated with a current LTE serving cell or PLMN of the UE.

8. The method of claim 1, wherein the NSA coverage database indicates New Radio (NR) cells that are identified as providing NSA coverage while the UE is camped on a given LTE cell with a public land mobile network (PLMN) identifier, and wherein, if a current LTE serving cell of the UE is not identified by the NSA coverage database, the set of cells are a set of most recently identified cells of the NSA coverage database associated with a same PLMN as the current LTE serving cell.

9. The method of claim 1, further comprising:
  providing an indication that an NSA coverage status of another cell is unknown.

10. The method of claim 9, wherein the NSA coverage status of the other cell is unknown if:
  the UE is in a connected mode,
  the UE is associated with a 2G network or a 3G network, or
  there are no frequency entries in the NSA coverage database.

11. The method of claim 1, wherein the NSA coverage status indicates that a cell, associated with the NSA coverage status, can provide NSA service in a dual connectivity mode.

12. A user equipment (UE), comprising:
  a processing system configured to:
    obtain a request to identify cells associated with a non-standalone (NSA) coverage status;
    measure a set of frequencies, associated with a Long Term Evolution (LTE) cell, referenced by an NSA coverage database maintained by the UE; and
    output information indicating one or more cells, of a set of cells associated with the set of frequencies, associated with the NSA coverage status,
      wherein the information is associated with whether a system information block (SIB) is scheduled on the one or more cells, and
      wherein the information indicates that a cell, of the one or more cells, is associated with the NSA coverage status if a synchronization signal block of the cell indicates that SIB1 transmission is scheduled for the cell and the NSA coverage database indicates that a SIB1 has been received for the cell.

13. The UE of claim 12, wherein the synchronization signal block indicates that the SIB1 transmission is scheduled for the cell via a frequency offset parameter of the synchronization signal block.

14. The UE of claim 12, wherein the processing system is configured to:

identify another cell, of the set of cells, that is not associated with the NSA coverage status when a synchronization signal block of the other cell indicates that SIB1 transmission is scheduled for the other cell and the NSA coverage database indicates that a SIB1 has not been received for the other cell.

15. The UE of claim 12, wherein the information indicates cells associated with the NSA coverage status that satisfy at least one of:

a band criterion, or a bandwidth threshold.

16. The UE of claim 15, wherein the band criterion or the bandwidth threshold is indicated by the request.

17. The UE of claim 15, wherein the band criterion or the bandwidth threshold is configured.

18. The UE of claim 12, wherein the NSA coverage database indicates New Radio (NR) frequencies that are identified as providing NSA coverage while the UE is camped on a given LTE cell and public land mobile network (PLMN), and wherein the NSA coverage database indicates that the NR frequencies are associated with a current LTE serving cell or PLMN of the UE.

19. The UE of claim 12, wherein the NSA coverage database indicates New Radio (NR) cells that are identified as providing NSA coverage while the UE is camped on a given LTE cell with a public land mobile network (PLMN) identifier, and wherein, if a current LTE serving cell of the UE is not identified by the NSA coverage database, the set of cells are a set of most recently identified cells of the NSA coverage database associated with a same PLMN as the current LTE serving cell.

20. The UE of claim 12, wherein the processing system is configured to:

output an indication that an NSA coverage status of another cell is unknown.

21. The UE of claim 20, wherein the NSA coverage status of the other cell is unknown if:

the UE is in a connected mode, the UE is associated with a 2G network or a 3G network, or there are no frequency entries in the NSA coverage database.

22. The UE of claim 12, wherein the NSA coverage status indicates that a cell, associated with the NSA coverage status, can provide NSA service in a dual connectivity mode.

23. A non-transitory computer-readable medium storing a set of instructions for wireless communication, the set of instructions comprising:

one or more instructions that, when executed by one or more processors of a user equipment (UE), cause the UE to:

receive a request to identify cells associated with a non-standalone (NSA) coverage status;

measure a set of frequencies, associated with a Long Term Evolution (LTE) cell, referenced by an NSA coverage database maintained by the UE; and provide information indicating one or more cells, of a set of cells associated with the set of frequencies, associated with the NSA coverage status, wherein the information is associated with whether a system information block (SIB) is scheduled on the one or more cells, and wherein the information indicates that a cell, of the one or more cells, is associated with the NSA coverage status if a synchronization signal block of the cell indicates that SIB1 transmission is scheduled for the cell and the NSA coverage database indicates that a SIB1 has been received for the cell.

24. The non-transitory computer-readable medium of claim 23, wherein the synchronization signal block indicates that the SIB1 transmission is scheduled for the cell via a frequency offset parameter of the synchronization signal block.

25. The non-transitory computer-readable medium of claim 23, wherein the one or more instructions further cause the UE to:

identify another cell, of the set of cells, that is not associated with the NSA coverage status when a synchronization signal block of the other cell indicates that SIB1 transmission is scheduled for the other cell and the NSA coverage database indicates that a SIB1 has not been received for the other cell.

26. The non-transitory computer-readable medium of claim 23, wherein the NSA coverage database indicates New Radio (NR) cells that are identified as providing NSA coverage while the UE is camped on a given LTE cell with a public land mobile network (PLMN) identifier, and wherein, if a current LTE serving cell of the UE is not identified by the NSA coverage database, the set of cells are a set of most recently identified cells of the NSA coverage database associated with a same PLMN as the current LTE serving cell.

27. An apparatus for wireless communication, comprising:

means for receiving a request to identify cells associated with a non-standalone (NSA) coverage status;

means for measuring a set of frequencies, associated with a Long Term Evolution (LTE) cell, referenced by an NSA coverage database maintained by the apparatus; and means for providing information indicating one or more cells, of a set of cells associated with the set of frequencies, associated with the NSA coverage status, wherein the information is associated with whether a system information block (SIB) is scheduled on the one or more cells, and wherein the information indicates that a cell, of the one or more cells, is associated with the NSA coverage status if a synchronization signal block of the cell indicates that SIB1 transmission is scheduled for the cell and the NSA coverage database indicates that a SIB1 has been received for the cell.

28. The apparatus of claim 27, wherein the synchronization signal block indicates that the SIB1 transmission is scheduled for the cell via a frequency offset parameter of the synchronization signal block.

29. The apparatus of claim 27, further comprising:

means for identifying another cell, of the set of cells, that is not associated with the NSA coverage status when a synchronization signal block of the other cell indicates that SIB1 transmission is scheduled for the other cell and the NSA coverage database indicates that a SIB1 has not been received for the other cell.

30. The apparatus of claim 27, wherein the NSA coverage database indicates New Radio (NR) cells that are identified as providing NSA coverage while the apparatus is camped on a given LTE cell with a public land mobile network (PLMN) identifier, and wherein, if a current LTE serving cell of the apparatus is not identified by the NSA coverage database, the set of cells are a set of most recently identified cells of the NSA coverage database associated with a same PLMN as the current LTE serving cell.

31. A method of wireless communication performed by an apparatus of a user equipment (UE), comprising:

receiving a request to identify cells associated with a non-standalone (NSA) coverage status;

measuring a set of frequencies, associated with a Long Term Evolution (LTE) cell, referenced by an NSA coverage database, wherein the NSA coverage database is maintained by the UE, wherein the NSA coverage database indicates New Radio (NR) cells that are identified as providing NSA coverage while the UE is camped on a given LTE cell with a public land mobile network (PLMN) identifier, and wherein, if a current LTE serving cell of the UE is not identified by the NSA coverage database, a set of cells associated with the set of frequencies are a set of most recently added cells of the NSA coverage database as indicated by corresponding time stamps and associated with a same PLMN as the current LTE serving cell; and providing information indicating one or more cells, of the set of cells associated with the set of frequencies, associated with the NSA coverage status, wherein the information, indicating the one or more cells, is associated with whether a system information block (SIB) is scheduled on the one or more cells.

32. The method of claim 31, wherein the NSA coverage database indicates NR frequencies that are identified as providing NSA coverage while the UE is camped on the given LTE cell.

33. The method of claim 31, wherein the NSA coverage database indicates NR frequencies associated with the current LTE serving cell.

34. A method of wireless communication performed by an apparatus of a user equipment (UE), comprising:

receiving a request to identify cells associated with a non-standalone (NSA) coverage status;

measuring a set of frequencies, associated with a Long Term Evolution (LTE) cell, referenced by an NSA coverage database, wherein the NSA coverage database is maintained by the UE;

identifying a cell, of a set of cells associated with the set of frequencies, that is not associated with the NSA coverage status when a synchronization signal block (SSB) of the cell indicates that system information block 1 (SIB1) transmission is scheduled for the cell and the NSA coverage database indicates that a SIB1 has not been received for the cell; and providing information indicating one or more cells, of the set of cells associated with the set of frequencies, associated with the NSA coverage status, wherein the information, indicating the one or more cells, is associated with whether a SIB is scheduled on the one or more cells.

35. A user equipment (UE), comprising:

a processing system configured to:

obtain a request to identify cells associated with a non-standalone (NSA) coverage status;

measure a set of frequencies, associated with a Long Term Evolution (LTE) cell, referenced by an NSA coverage database maintained by the UE, wherein the NSA coverage database indicates New Radio (NR) cells that are identified as providing NSA coverage while the UE is camped on a given LTE cell with a public land mobile network (PLMN) identifier, and wherein, if a current LTE serving cell of the UE is not identified by the NSA coverage database, a set of cells associated with the set of frequencies are a set of most recently added cells of the NSA coverage database as indicated by corresponding time stamps and associated with a same PLMN as the current LTE serving cell; and output information indicating one or more cells, of the set of cells associated with the set of frequencies, associated with the NSA coverage status, wherein the information, indicating the one or more cells, is associated with whether a system information block (SIB) is scheduled on the one or more cells.

36. A user equipment (UE), comprising:

a processing system configured to:

obtain a request to identify cells associated with a non-standalone (NSA) coverage status;

measure a set of frequencies, associated with a Long Term Evolution (LTE) cell, referenced by an NSA coverage database maintained by the UE;

identify a cell, of a set of cells associated with the set of frequencies, that is not associated with the NSA coverage status when a synchronization signal block (SSB) of the cell indicates that system information block 1 (SIB1) transmission is scheduled for the cell and the NSA coverage database indicates that a SIB1 has not been received for the cell; and output information indicating one or more cells, of the set of cells associated with the set of frequencies, associated with the NSA coverage status, wherein the information, indicating the one or more cells, is associated with whether a SIB is scheduled on the one or more cells.

37. The UE of claim 36, wherein the one or more cells are associated with the NSA coverage status when a SSB of the one or more cells indicates that SIB1 transmission is not scheduled for the one or more cells and the NSA coverage database indicates that a SIB1 has not been transmitted for the cell.

38. The UE of claim 36, wherein the one or more cells are associated with the NSA coverage status when a SSB of the one or more cells indicates that SIB1 transmission is scheduled for the one or more cells and the NSA coverage database indicates that a SIB1 has been transmitted for the cell.

* * * * *